(12) United States Patent  (10) Patent No.: US 7,392,922 B2
Vanstaan et al.  (45) Date of Patent: Jul. 1, 2008

(54) IN-CAN FUEL CELL METERING VALVE

(75) Inventors: Valery H. Vanstaan, Highland Park, IL (US); Mohamed K. Wagdy, Arlington Heights, IL (US); Adalberto Geier, Trento (IT); Giuseppe Dalsant, Trento (IT)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/827,551

(22) Filed: Apr. 19, 2004

(65) Prior Publication Data

US 2005/0230451 A1 Oct. 20, 2005

(51) Int. Cl.
*B25C 1/08* (2006.01)
*G01F 11/38* (2006.01)

(52) U.S. Cl. .................... 227/10; 227/130; 227/156; 222/402.1

(58) Field of Classification Search .............. 227/8, 227/9, 10, 130, 156; 222/402.1, 402.16, 222/402.18, 402.2; 285/3, 4
See application file for complete search history.

(56) References Cited

U.S. PATENT DOCUMENTS

| 2,828,892 | A | * | 4/1958 | Ward | 222/402.16 |
| 2,998,168 | A | * | 8/1961 | Waldherr | 222/402.2 |
| 3,073,489 | A | * | 1/1963 | Friedman | 222/402.2 |
| 3,610,481 | A | * | 10/1971 | Marraffino | 222/402.24 |
| 4,331,119 | A | * | 5/1982 | Chadwick | 123/458 |
| 4,331,277 | A | * | 5/1982 | Green | 227/19 |
| 4,483,474 | A | * | 11/1984 | Nikolich | 227/8 |
| 4,522,162 | A | | 6/1985 | Nikolich | |

(Continued)

FOREIGN PATENT DOCUMENTS

DE 42 43 517 A1 6/1994

(Continued)

OTHER PUBLICATIONS

English Translation of Foreign Patent Document No. DE 198 53 554 C1 (Jul. 6, 2000, Dr. Olaf Kersten).

(Continued)

*Primary Examiner*—Paul R. Durand
(74) *Attorney, Agent, or Firm*—Greer, Burns & Crain, Ltd.; Lisa M. Soltis; Mark W. Croll

(57) ABSTRACT

A fuel cell for use with a combustion tool for delivery of a predetermined amount of fuel with each stem actuation is provided and includes a housing defining an open end enclosed by a closure. A main valve stem has an outlet, disposed in operational relationship to the open end and reciprocating relative to the housing at least between a closed position wherein the stem is relatively extended, and an open position wherein the stem is relatively retracted. A fuel metering valve is located within the housing, associated with the main valve stem, including a fuel metering chamber disposed in close proximity to the closure and configured so that when the stem is in the open position, only a measured amount of fuel is dispensed through the outlet. In a preferred embodiment, the fuel cell housing includes a separate fuel container, and the fuel metering valve includes a valve body having a second end opposite the fuel metering chamber located within the container.

19 Claims, 6 Drawing Sheets

U.S. PATENT DOCUMENTS

| | | | |
|---|---|---|---|
| 4,721,240 A | | 1/1988 | Cotta |
| 5,115,944 A | * | 5/1992 | Nikolich ................... 222/94 |
| 5,169,038 A | * | 12/1992 | Di Giovanni ............ 222/402.2 |
| 5,211,316 A | * | 5/1993 | Adalberto et al. ........ 222/386.5 |
| 5,368,231 A | * | 11/1994 | Brunerie et al. ............. 239/145 |
| 5,632,421 A | * | 5/1997 | Colombo ................ 222/402.2 |
| 5,695,096 A | * | 12/1997 | Yquel ................... 222/402.18 |
| 5,697,532 A | * | 12/1997 | Wilde et al. ............ 222/402.16 |
| 5,730,326 A | * | 3/1998 | Kaeser ........................ 222/95 |
| 5,904,274 A | * | 5/1999 | Warby et al. ............. 222/402.2 |
| 5,927,563 A | * | 7/1999 | Kellner .................. 222/402.22 |
| 6,058,960 A | * | 5/2000 | Kopp ...................... 137/68.11 |
| 6,085,945 A | * | 7/2000 | Fransen ................ 222/402.18 |
| 6,202,900 B1 | * | 3/2001 | Tsutsui et al. ............ 222/402.2 |
| 6,302,297 B1 | | 10/2001 | Richardson et al. |
| 6,311,876 B1 | * | 11/2001 | Liu ........................ 222/402.1 |
| 6,315,173 B1 | * | 11/2001 | Di Giovanni et al. .... 222/402.2 |
| 6,419,168 B1 | | 7/2002 | Thieleke et al. |
| 6,520,377 B2 | * | 2/2003 | Yquel ........................... 222/1 |
| 6,644,306 B1 | | 11/2003 | Riebe et al. |
| 6,681,955 B2 | | 1/2004 | Rosenbaum |

FOREIGN PATENT DOCUMENTS

| | | |
|---|---|---|
| DE | 198 53 554 C1 | 7/2000 |
| DE | 201-14780 U1 | 9/2001 |
| DE | 2020 01 697 U1 | 6/2002 |
| GB | 1 525 440 | 9/1978 |

OTHER PUBLICATIONS

English Translation of Foreign Patent Document No. DE 198 53 555 A 1 (May 5, 2000, Dr. Olaf Kersten).

English Translation of Foreign Patent Document No. DE 198 53 556 C 1 (Jun. 6, 2008, Dr. Olaf Kersten).

* cited by examiner

FIG. 6
FIG. 7
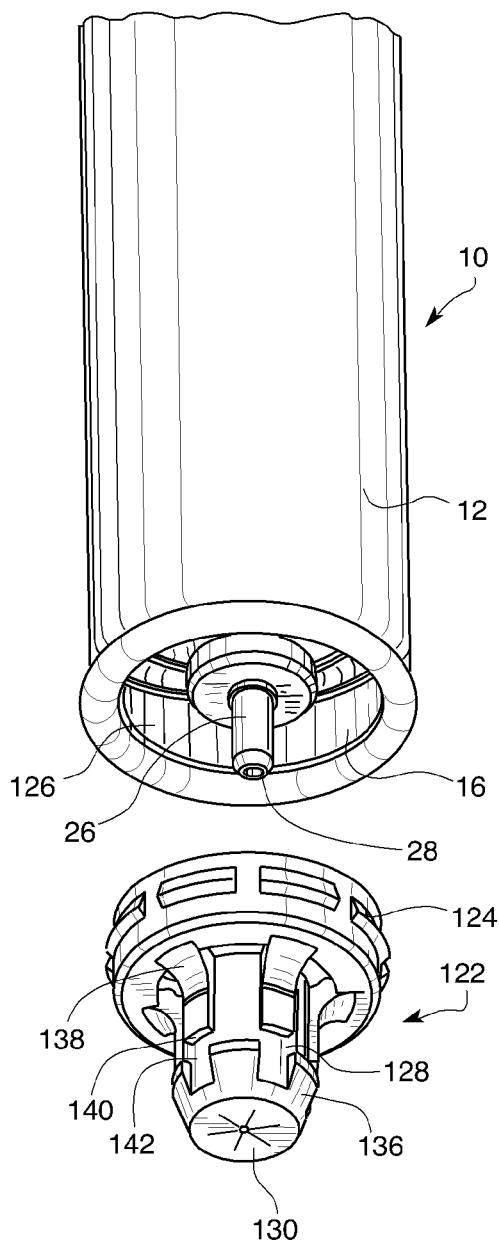
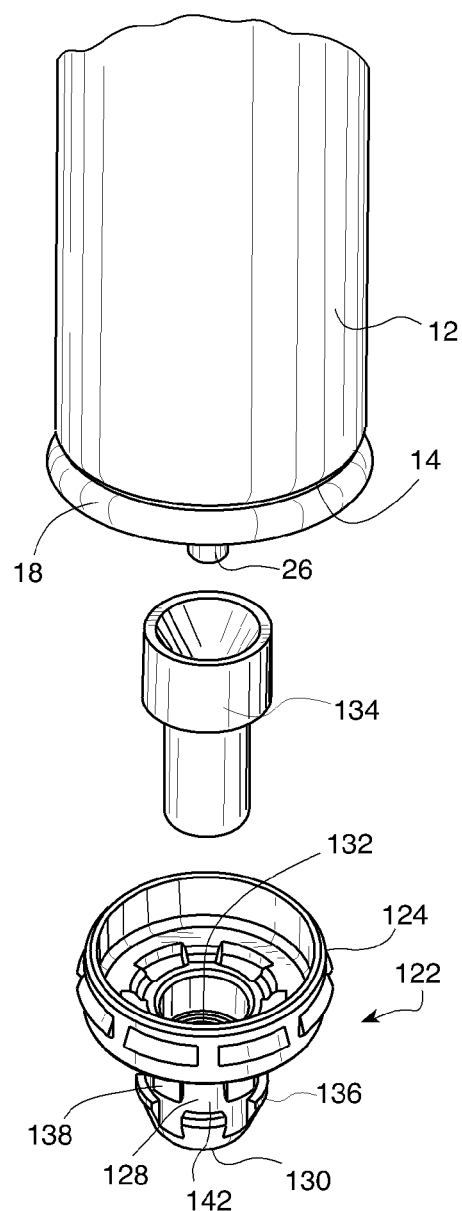

IN-CAN FUEL CELL METERING VALVE

BACKGROUND OF THE INVENTION

This invention relates generally to improvements in fuel cell fuel delivery arrangements for use in combustion tools, and more specifically to metering valves used with such fuel cells for delivering the appropriate amount of fuel for use by a combustion tool during the driving of fasteners. While the present application is focused on the use of fuel cells in combustion tools, it is contemplated that other applications are contemplated in which fuel cells or other pressurized containers using stem valves are employed, such as, but not limited to cosmetics and pharmaceutical products.

As exemplified in Nikolich U.S. Pat. Nos. 4,403,722, 4,483,474, 4,522,162, and 5,115,944, all of which are incorporated by reference, it is known to use a dispenser such as a fuel cell to dispense a hydrocarbon fuel to a combustion tool, also known as a combustion gas-powered tool, such as, for example, a combustion gas-powered fastener-driving tool. Such fastener-driving tools and such fuel cells are available commercially from ITW-Paslode (a division of Illinois Tool Works, Inc.) of Vernon Hills, Ill., under its IMPULSE trademark. In particular, a fuel cell of this type is described in Nikolich U.S. Pat. No. 5,115,944, listed above.

One design criterion associated with the use of such fuel cells, which contain separate compartments of pressurized fuel and propellant, is the prevention of leakage of one or both of the above constituents. The objective is to prevent or minimize leakage after production and before use, also known as shelf life, and also during periods when the fuel cell is installed in the tool but the tool is stored or otherwise not in use. As with other aerosol containers, a certain amount of leakage occurs over time. However, in the environment of combustion powered fastener driving tools, there is a concern that gradual leakage over a prolonged shelf life may result in reduced performance of the fuel cell due to insufficient propellant and/or fuel. Accordingly, present manufacturer recommendations call for a 12-18 month maximum shelf life of such fuel cells to ensure that sufficient propellant and/or fuel remains for expected performance needs.

Another design criterion of such fuel cells is that only a desired amount of fuel should be emitted by the fuel cell for each combustion event. The amount of fuel should be carefully monitored to provide the desired combustion, yet in a fuel-efficient manner to prolong the working life of the fuel cell. Prior attempts to address this dosage factor have resulted in fuel metering valves located in the tool (U.S. Pat. No. 5,263,439) or attached to the fuel cell (U.S. Pat. No. 6,302,297), both of which are also incorporated by reference.

Regardless of the above-listed locations of such fuel metering valves, fuel leakage has remained a design consideration. In the case of internal tool fuel metering valves, an excessive number of seal locations inherently create multiple opportunities for leaks. In the case of external fuel cell metering valves, to facilitate disposability of the fuel cell and valve, inexpensive materials are used. However, the aggressive nature of the fuel constituents in some cases cause premature failure of the valve seals or the valve housing itself.

Another design consideration of such fuel cells is that when metering valves are attached to the fuel cell, there is some duplication of components, in that a first valve controls the flow of fuel from the cell, and a second valve controls a metered dose of fuel for delivery to the tool for a single combustion event. A related concern is that when such cell-mounted metering valves are shipped with the fuel cell in an inoperative position, the user must activate the cell by moving the valve into position. It is thus difficult for the end user to discover and/or prevent fuel leakage due to improper installation of, or internal defects in, the metering valve.

Yet another design factor of cell-mounted metering valves is that once the metering valve is operationally installed, the main cell stem valve is continually open. Thus, the nature of the seal formed by the main fuel cell valve stem seal changes from a face seal to a radial seal about the valve stem. In this position, the seal is relaxed and provides less effective sealing. As such, there is a greater potential for fuel leakage from the fuel cell.

Accordingly, there is a need for an improved combustion tool fuel cell valve arrangement which reduces the number of components, and accordingly the potential for fuel/propellant leaks. There is also a need for an improved combustion tool fuel cell construction which reduces the number of sealing locations and the periodic loading on the main fuel cell valve stem.

BRIEF SUMMARY OF THE INVENTION

The above-listed needs are met or exceeded by the present fuel cell metering valve for a combustion tool which, in a preferred embodiment, features a metering valve internally mounted in the fuel cell. As such, the valve dispenses a metered amount of fuel with every actuation of the stem. In addition, the present valve has three positions, closed, open and container fill or "bag gassing". Thus, the valve and the fuel cell are normally closed, and the main valve stem seal operates as a face seal for more effective sealing action. An advantage of the present arrangement is that the valve is closed for a large part of its operational life, increasing the sealing action and prolonging the operational life of the fuel cell due to reduced leakage. In addition, the valve is provided with a one-piece valve body, one end of which is located inside the inner fuel container located within the fuel cell. By locating the metering valve inside the fuel cell housing or can, the present valve combines in a single unit the functions of the former standard fuel cell check valve and a supplemental metering valve typically mounted outside of the fuel cell and configured for receiving the valve stem. Thus, the number of components is reduced, improving reliability and reducing the cost of the system. Another advantage of this design is that it facilitates the three position operation of the valve stem (open, closed and container fill), and also makes it easier for manufacturers to provide cells having a variety of dosages. Dosage change is obtained by altering the dimensions of the fuel metering chamber, preferably by replacing only a single component. Also, by eliminating the need for engaging an external metering valve, the present device is more user friendly. Further, the present fuel cell is easier to install into a fastener driving tool.

More specifically, a fuel cell for use with a combustion tool is provided and includes a housing defining an open end enclosed by a closure. A main valve stem has an outlet, disposed in operational relationship to the open end and reciprocating relative to the housing at least between a closed position wherein the stem is relatively extended, and an open position wherein the stem is relatively retracted. A fuel metering valve is located within the housing, associated with the main valve stem, including a fuel metering chamber disposed in close proximity to said closure and configured so that when the stem is in the open position, only a measured amount of fuel is dispensed through the outlet. In a preferred embodiment, the fuel cell housing includes a separate fuel container, and the fuel metering valve includes a valve body having a second end opposite the fuel metering chamber located within the container.

BRIEF DESCRIPTION OF THE SEVERAL VIEWS OF THE DRAWINGS

FIG. 6 is a fragmentary exploded front view of a fuel cell and an adapter suitable for use with the present combustion tool; and FIG. 7 is a fragmentary exploded view of the fuel cell and adapter of FIG. 6 from a rear angle.

DETAILED DESCRIPTION OF THE INVENTION

Figure 1:
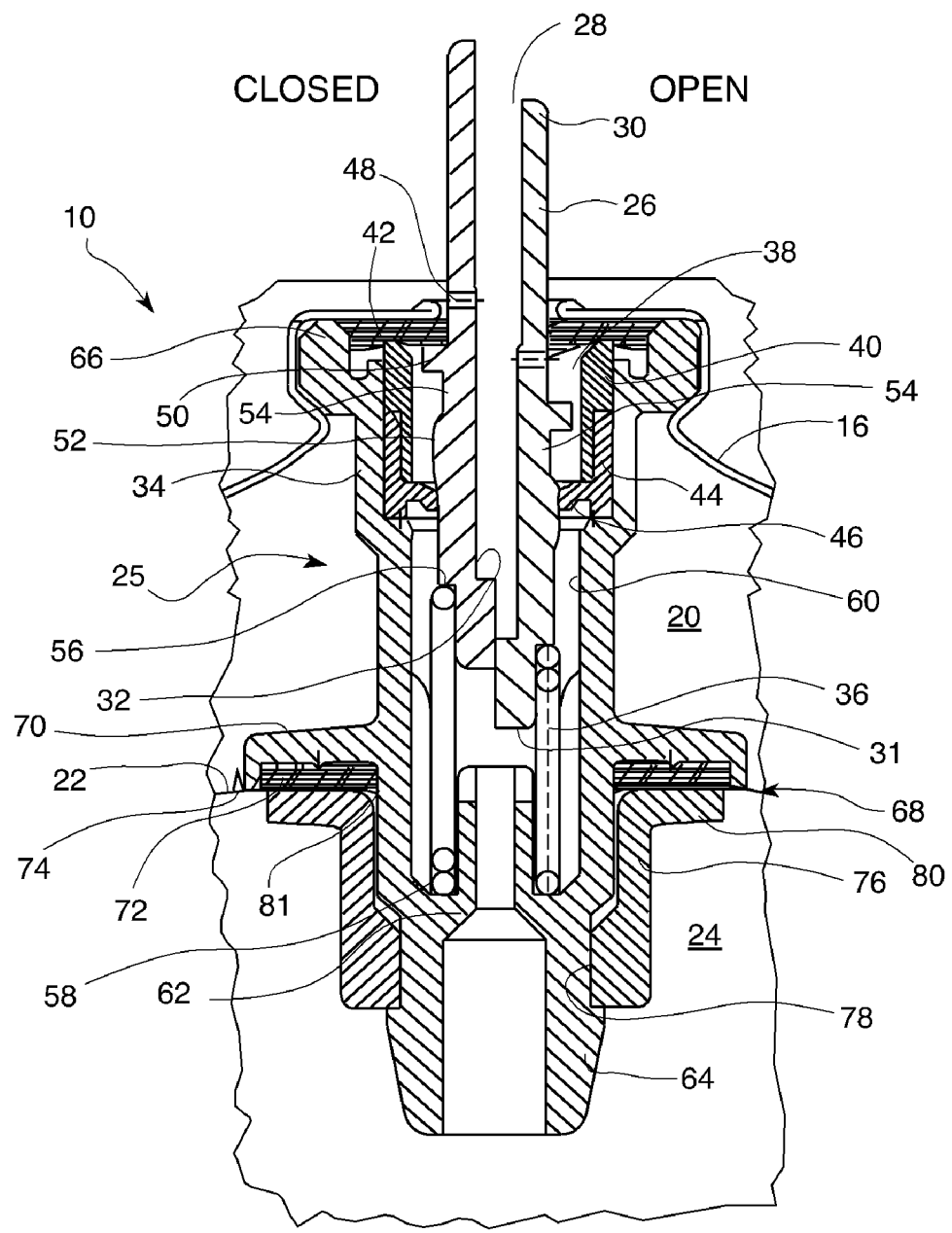
FIG. 1 is a split vertical cross-section of a combustion tool fuel cell provided with the present internal metering valve, shown in the closed (left) and open (right) positions.

Referring now to FIGS. 1-4, a fuel cell of the type used in a combustion tool is generally designated 10, and includes an outer housing or shell 12 (seen in FIG. 3) defining an open upper end 14 (FIG. 3) enclosed by a closure 16 which is sealingly secured to the housing at a peripheral edge 18 which overlaps and is preferably crimped over the upper end, as is well known in the art. The general construction of such fuel cells is disclosed in U.S. Pat. No. 5,115,944, incorporated by reference herein. Inside the housing 12, a first space 20 is defined for a first component, which is typically a pressurized propellant. Also provided within the housing 12 is a bag-like container 22 defining a second space 24 for a second component, typically a combustible fuel, usually a liquefied hydrocarbon, either alone or mixed with other compounds. While it is preferred that the first space 20 encloses the propellant and the second space 24 the fuel, other arrangements are contemplated as long as there is an environment created within the housing 12 to pressurize the fuel and maintain that pressure as the amount of fuel is reduced, as through consumption or other factors. A feature of the present fuel cell 10 is the location of an internal fuel metering valve, generally designated 25, within the housing 12.

A main valve stem 26 is configured for emitting fuel from the container 22 and as such has an outlet 28 at a first end 30 projecting from the housing, and a second end 31 opposite the first end. The valve stem 26 is in fluid communication with the source of fuel, preferably the container 22, which is preferably flexible or compressible to accommodate pressure exerted by the propellant as fuel is consumed and the volume of the container accordingly reduced. The first and second ends 30, 31 are separated from each other, preferably by a passageway 32. To emit fuel, the main valve stem 26 reciprocates relative to the housing 12 within a valve body 34 under a biasing force, preferably exerted by a biasing element 36 such as a spring, between a closed position (shown on the left half of FIG. 1) and an open position (shown on the right half of FIG. 1). In the closed position, the main valve stem 26 is biased by the biasing element 36 to an extended condition.

In the open position, the main valve stem 26 is pushed back or retracted in a way that overcomes the biasing force of the element 36.

The fuel metering valve 25 includes the main valve stem 26 and is configured so that when the stem is in the open position, only a measured amount of fuel is dispensed through the outlet. It is preferred that the fuel metering valve 25 is configured so that the main valve stem 26 is in the open position only when fuel is being dispensed to the tool.

Figure 2:
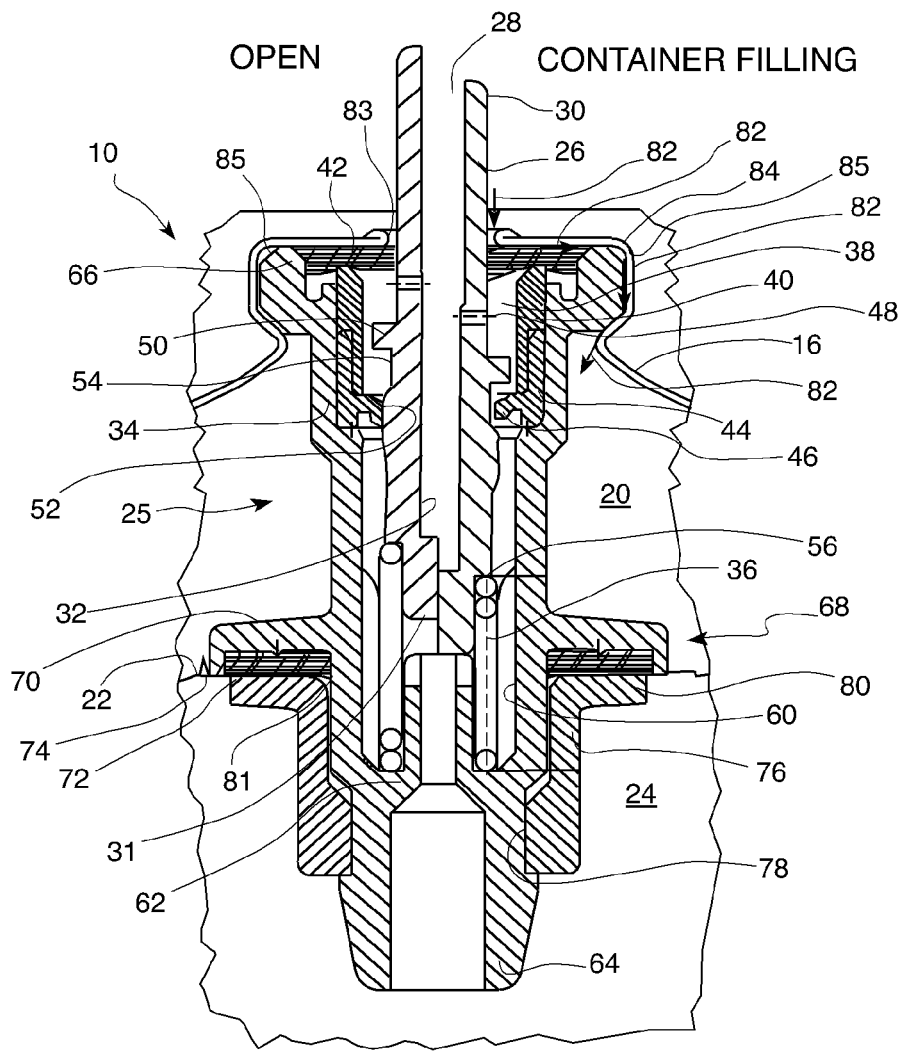
FIG. 2 is a split vertical cross-section of the fuel cell of FIG. 1, shown in the open (left) and in-bag gassing (right) positions.

In the embodiment of FIGS. 1 and 2, the fuel metering valve 25 includes a fuel metering chamber 38 located within the housing 12. This configuration is intended to reduce components and/or to reduce unwanted leakage or emission of fuel, which are design issues with current fuel cells. Preferably, the fuel metering chamber 38 is located within the valve body 34, and more preferably in close proximity to the closure 16, however locations externally of the valve body are also contemplated. By incorporating the metering valve 25 so that the valve body 34 is located permanently inside the fuel cell 10, potential leakage areas at the engagement point of an external valve to the prior art main valve stem are eliminated. Also, potential dosage changes due to environmentally or hydrocarbon exposure-caused changes in external metering valve dimensions are also eliminated.

In the present fuel cell 10, the fuel metering chamber 38 is exposed to the hydrocarbon fuel upon filling, and as such is constantly exposed to the hydrocarbons, which reduces the possibility of dimensional change. A chamber body 40 partially defines the fuel metering chamber 38 and sealingly engages a main or outlet seal 42 for preventing unwanted leakage. Thus, in the preferred embodiment, the chamber body 40 is separated from the closure 16 by the main seal 42. A second component 44 of the chamber body 40 includes a generally flexible, radially inwardly projecting lip 46 which, acting as a lip seal, slidingly and wipingly engages the reciprocating main valve stem 26. While the first and second components 40, 44 are shown as separate pieces, it is contemplated that they may be provided in unitary format depending on the application. It is also contemplated that the material used to form second component 44 may be made of a different material from the main portion of the chamber body 40, for example in situations where a more chemically or environmentally resistant material is needed to withstand the detrimental effects of the fuel. In addition, it is contemplated as a feature of the present metering valve 25 that the location and construction of the fuel metering chamber 38 are such that dimensions of the chamber body 40 may be changed to alter the fuel dosage volume emitted from the outlet 28, for example to suit particular application conditions. The change may be accomplished by merely replacing the chamber body 40 with another body having a different volume. Also, with such a change, the main seal 42 is not changed or tampered with. This alteration of the dosage volume is contemplated as being performed by the manufacturer, not the user.

The main valve stem 26 is configured for permitting the delivery of a designated amount of fuel to the fuel metering chamber 38 in the closed position, and for releasing that designated amount of fuel in the open position for emission through the outlet 28. To that end, among other things, the main valve stem 26 includes at least one inlet 48 and at least one generally radially projecting formation functioning as a stop member 50. While the precise number, location and configuration of the at least one inlet 48 and the at least one stop member 50 may vary to suit the application, it is preferred that the inlet be located closer to the outlet 28 than is the stop member 50. The inlet 48, which is in fluid communication with the passageway 32, receives fuel from the fuel metering chamber 38 while the main valve stem 26 is in the open position, at which time the inlet is located within the fuel metering chamber. It will be seen that the main valve stem 26 is closed off at the second end 31 and fuel enters the passageway 32 through the inlet 48.

In the closed position, the inlet 48 is no longer located within the fuel metering chamber 38, and is preferably external of the seal 42. Thus, in this position, fuel cannot enter the main valve stem 26. The at least one stop member 50 is positioned on the main valve stem 26 so that it engages the outlet seal 42 and prevents further movement of the valve stem past the closure 16. Another feature of the main valve stem 26 is a generally radially enlarged portion 52. The enlarged portion 52 is of sufficient diameter to sealingly engage the lip seal 46 and prevent the passage of fuel into or out of the entry of fuel relative to the fuel metering chamber 38. A standard or relatively narrow diameter portion 54 of the main valve stem 26 is located between the stop 50 and the enlarged portion 52. At the opposite end, the generally enlarged portion 52 gradually reduces in diameter to form a seat 56 for the biasing element 36. An opposite end of the biasing element 36 engages an end 58 of a body cavity 60 in the main valve body 34 in which reciprocates the main valve stem 26.

The gradual reduction in diameter of the main valve stem 26 is such that fuel can pass the lip seal 46 and enter the fuel metering chamber 38. This entry of fuel into the chamber 38 occurs when the main valve stem 26 is in the closed position. Fuel enters the chamber 38 through the body cavity 60 which, in turn is in fluid communication with a second end 62 defining a nipple portion of the valve body 34. A receiving end 64 of the nipple portion of the valve body 34 is located within, and is in fluid communication with the second space 24, which preferably contains the fuel. As such, fuel enters the nipple portion, the cavity 60 and the metering chamber 38 prior to being emitted from the outlet 28.

To facilitate the delivery of fuel to the metering chamber 38, the valve body 34 is secured to the container 22, preferably such that the valve body has a first end 66 engaging the closure 16, such as by being crimped, and the second end 62 having the nipple portion located within the container. It will be seen that the biasing element 36 is located in the valve body 34 between the second end 62 and the first end 66, the latter providing the location for the fuel metering chamber 38, which is opposite the second end 62. It is contemplated that variations of this disposition of the valve body 34 are suitable for achieving the goal of secure mounting of the valve body relative to the fuel cell 10 for support and for consistent fuel metering during tool operation.

More specifically, in the preferred embodiment, the valve body 34 includes a clamp formation 68 for securing the nipple portion 62 to the container 22. A radial flange 70 on the valve body 34 receives a washer-like container seal or gasket 72 located on an outside 74 of the container 22, and a clamp ring 76 located inside the container for sandwiching a portion of the container between the valve body and the clamp ring. While other types of attachment are contemplated, the clamp ring 76 is snap fit upon the valve body 34 by being received in an annular groove 78 and includes a radially projecting ring 80 which secures a portion of the container 22 against the gasket 72. This arrangement is desired for providing secure clamping while protecting the flexible material used to make the container 22. Also, with this arrangement, the container 22 is supported around an opening 81 through which is inserted the nipple portion 62 of the valve body 34. Preferably, the valve body 34 is clamped to the container 22 prior to sealing of the container. While this type of connection of the valve 25 to the container 22 is preferred, it is also contemplated that a conventional dip tube or other equivalent structures used in the fuel cell or pressurized fluid dispenser art may be alternatively employed.

Referring now to FIG. 2, besides the closed and open positions described in relation to FIG. 1, it is preferred that the valve body 34 and the main valve stem 26 provide a third position, referred to as a container filling or an in-bag gassing position, whereby the container 22 may be filled with fuel after assembly of the fuel cell 10. In the container filling position, the main valve stem 26 is retracted into the valve body 34 past the open position so that fuel enters through the outlet 28, passes into the inlet 48, into the fuel metering chamber 38, passes around the stop 50 and through the gap between the lip seal 46 and the generally radially enlarged portion 52, into the body cavity 60, through the nipple portion 62 and into the container 22. It will be appreciated that the body cavity 60 is of sufficient length to accommodate the axial travel of the main valve stem 26 as it reciprocates between the closed, open and container filling positions. It will be seen that the relative position of the main valve stem 26 changes relative to the fuel metering chamber 38 in the respective open, closed and container filling positions. In addition, the relationship between the generally radially enlarged portion 52 and the lip seal 46 is that the portion and the seal are in sealing engagement in the open position, but are disengaged in the closed and container filling positions, thus allowing the passage of fuel therebetween.

Figure 2A:
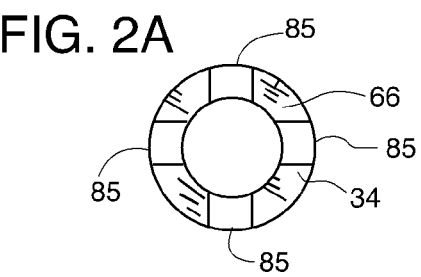
FIG. 2A is an end view of the valve body of FIG. 2, with parts omitted for clarity.
Figure 3:
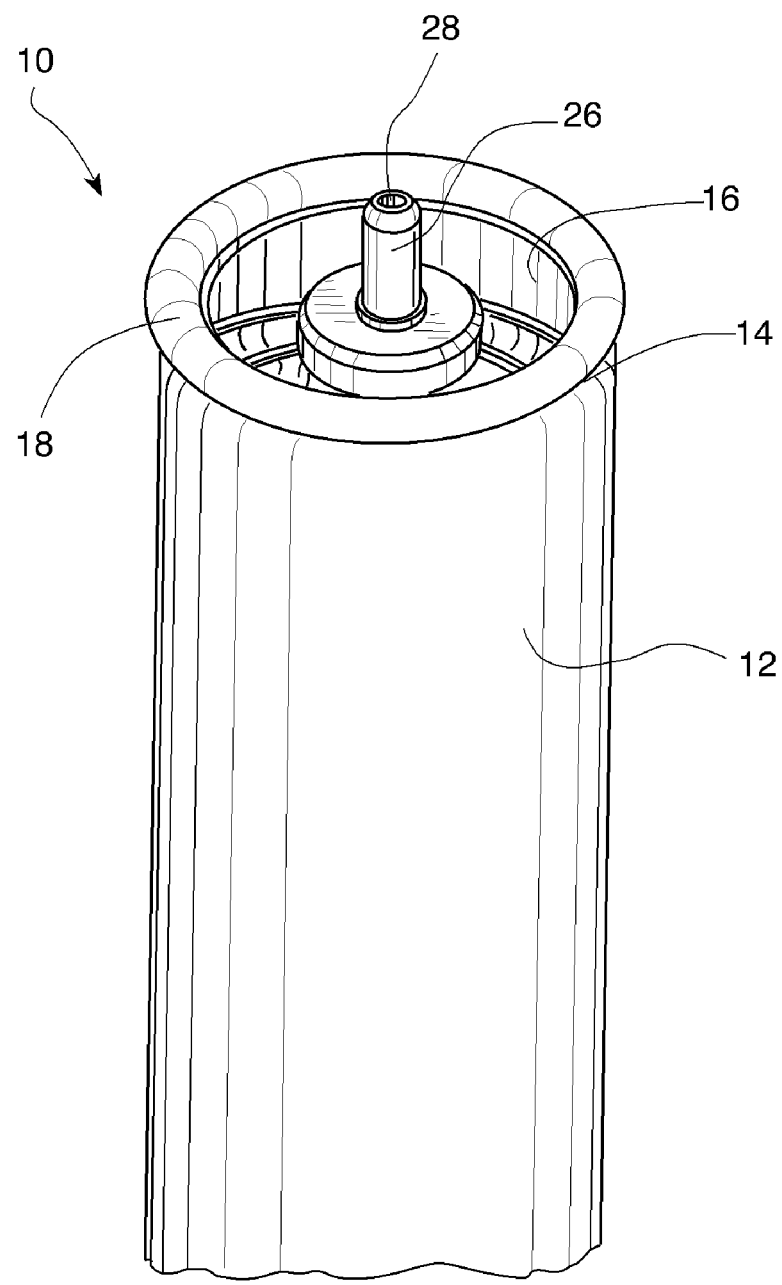
FIG. 3 is a fragmentary perspective view of a fuel cell of the type suitable for incorporating the present metering valve.

It will also be seen that the filling operation may be accomplished through the main valve stem 26 for the product/fuel as described above, or around or in a region adjacent the main valve stem 26 for propellant, by temporarily flowing around the main seal 42. More specifically, and referring again to FIG. 2, a filling head (not shown), known in the art, sealingly connects the fuel cell 10 to a supply of propellant. Engagement of the head upon the fuel cell causes the depression/retraction of the main valve stem 26 to the position shown on the right in FIG. 2. Propellant, designated by arrows 82, enters a gap 83 between the retracted valve stem 26 and the closure 16. Since the main valve stem 26 is retracted, the stop member 50 is not pressing against the outlet seal 42, thus causing the seal to relax and permit the inflow of the propellant 82. Next, the propellant 82 migrates radially between the seal 42 and the closure 16, until it reaches an edge 84 of the first end 66 of the valve body 34. To facilitate migration of the propellant 82 around the valve body 34 and into the first space 20, the edge 84 is provided with at least one and preferably four slots 85 (best seen in FIG. 2A). The number and configuration of the slots 85 may vary to suit the application, as long as sufficient space is provided for fluid communication into the space 20.

Figure 4:
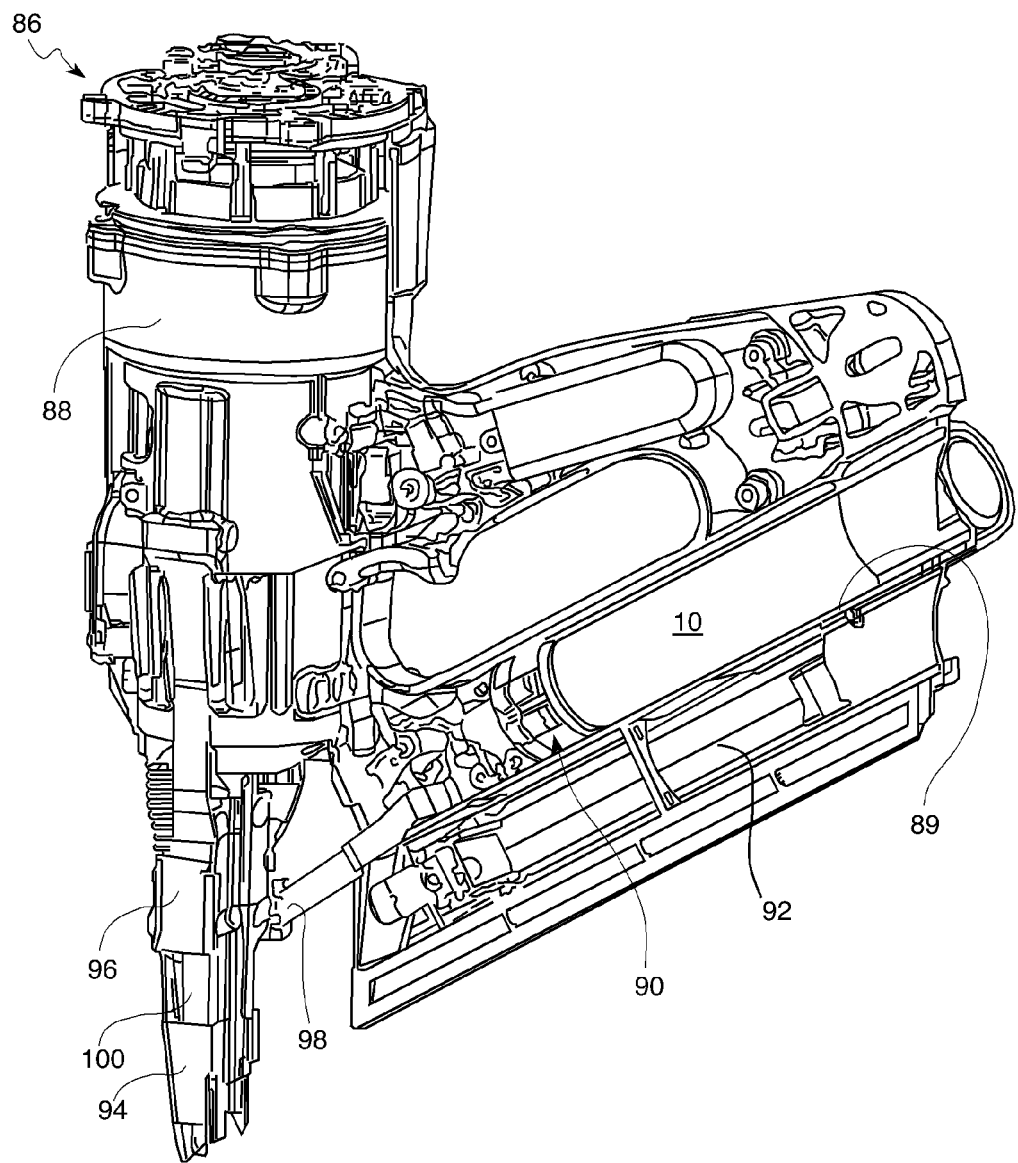
FIG. 4 is a perspective view of a combustion tool of the type suitable for use with the present fuel cell.

Referring now to FIG. 4, a combustion tool of the type suitable for use with the present fuel cell 10 is generally designated 86 in which the fuel cell 10 is inserted at a generally transverse or oblique angle to a longitudinal axis of a main combustion chamber 88 into a fuel cell chamber 89. In the depicted embodiment, the fuel cell 10 is inserted into the chamber 89 to be generally parallel to a fastener magazine 92, although other orientations are contemplated. The other type, as described in U.S. Pat. No. 5,263,439, receives the fuel cell 10 in a fuel cell chamber or adapter generally parallel to the main combustion chamber. Regardless of the type of tool, it will be appreciated that, upon the insertion of the fuel cell 10 into the chamber 89 and connected to an adapter 90, the tool is configured so that upon engagement of the tool with a workpiece, and a depression of the tool relative to the workpiece, a designated volume or dose of fuel will be dispensed from the fuel cell 10 to an internal fuel line (not shown) in the tool to enable the driving of a fastener through combustion as is known in the art.

Figure 5:
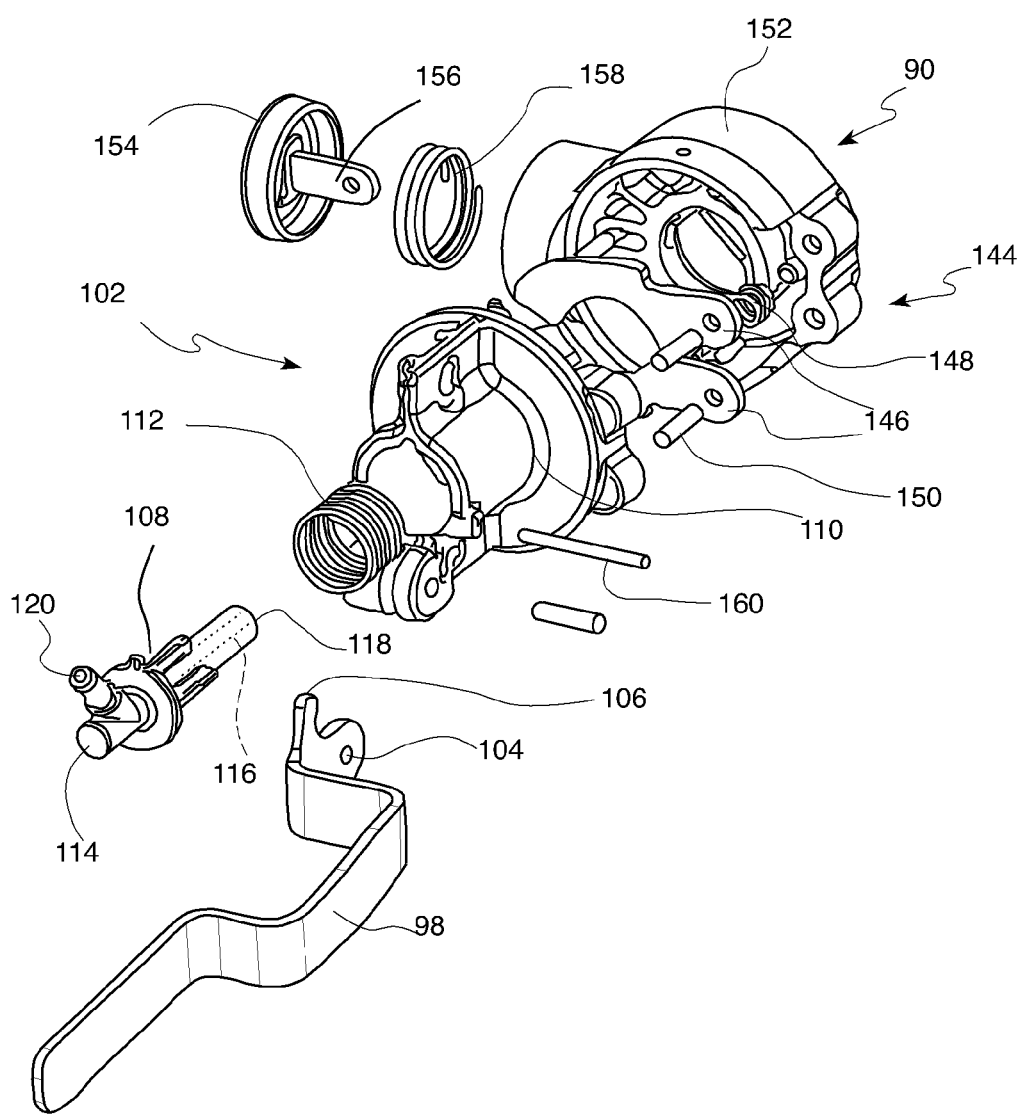
FIG. 5 is an exploded perspective of an adapter actuator and linkage suitable for use with the tool of FIG. 4.

Referring now to FIGS. 4 and 5, the workpiece contact element 94 and the associated linkage 96 which transmits a mechanical force to the adapter 90 for triggering the dispensing of the fuel stored in the fuel metering chamber 38. In this embodiment, it will be seen that the linkage 96 includes an actuator arm 98 projecting generally transversely or obliquely to the main combustion chamber axis, and generally parallel to the fuel cell chamber 89 and the magazine 92. It will be seen that upon movement of the workpiece contact element 94 relative to a nosepiece 100 prior to combustion, the actuator arm 98 ultimately causes a depressing action to be exerted upon the main valve stem 26 of the fuel cell 10. In this manner, the fuel temporarily stored in the fuel metering chamber 38 is dispensed to the tool 86.

More specifically, and referring now to FIG. 5, included in the adapter 90 is an inline actuator generally designated 102 which functions so that movement of the workpiece contact element 94 causes the linkage 96 and the actuator arm 98 to depress or retract the main valve stem 26 for fuel delivery. More specifically, the actuator arm 98 pivots about a pivot point 104 and at an opposite end is moved by at least one of the linkage 96 or the workpiece contact element 94. A thumb-like actuator lug 106 on the arm 98 engages an injector cartridge 108 which functions as a trigger. Upon axial depression by the lug 106, the injector cartridge 108 is axially depressed relative to a housing enclosure 110 and against a biasing force generated by a cartridge spring 112 or other biasing element. In the preferred embodiment, the pivot point 104 is located on the housing enclosure 110, but other locations on the tool 86 are contemplated. Also, it is preferred that the housing enclosure 110 be made of plastic which serves as an insulator to prevent vapor lock, a problem encountered with prior art combustion tools. Further, it is preferred that the injector cartridge 108 includes a wear point 114 configured of relatively rigid material such as hardened steel to receive the actuator lug 106 on a repetitive basis without deterioration. Reciprocation of the injector cartridge/trigger 108 causes retraction/opening of the main valve stem 26 to release the fuel stored in the metering chamber 38 for transmission through the fuel line 104 to the combustion chamber 88.

An internal passageway 116 (shown hidden in FIG. 5) connects an inlet end 118 to an outlet nipple 120. As such, fluid communication is established between the main valve stem 26, placed in engagement with the outlet nipple 120, and either a fuel line or a connector tube (not shown) typically found in such tools. The outlet nipple 120 is preferably barbed to frictionally engage a flexible fuel line such as a flexible connector tube. Such a flexible fuel line is connected to a main fuel line (not shown) and remains connected to the injector cartridge 108 during the operational reciprocation.

Referring now to FIGS. 6 and 7, it is known from commonly owned U.S. Patent Application Publication No. U.S. 2002/0043547, incorporated by reference herein, to provide a fuel cell adapter, generally designated 122 for a fuel cell which facilitates retention within the tool and alignment of the main valve stem with corresponding fuel metering valve nipples or fuel lines. Included on the fuel cell adapter 122 is a base 124 configured for frictionally engaging an inner closure surface 126 and a generally cylindrical nozzle 128 projecting from the base to a free end 130. A passageway 132 is provided inside the nozzle 128 for receiving the main valve stem 26 from a rear end, and the inlet end 118 of the injector cartridge 108 from the free end 130. An appropriate sealing member, which can take many forms, and is generally designated 134 and receives corresponding opposing ends of the cartridge 108 and the valve stem 26 so that a close, substantially leak-resistant fluid communicating connection is established for efficient fuel transfer.

In the preferred embodiment, the adapter 122 is provided on its free end 130 with a plurality of radially spaced lugs 136 and also a plurality of radially spaced ribs 138 with truncated ends 140. Between the ends 140 and the lugs 136 is defined a gripping area 142 of relatively narrow diameter.

Referring again to FIG. 5, it will be seen that the present fuel cell 10 can be fitted with the fuel cell adapter 122 and incorporated into the tool 86. To facilitate alignment and fluid flow between the main valve stem 26 and the injector cartridge 108, the housing enclosure 110 is provided with a latch 144 preferably including a pair of biased, opposing tangs 146 biased to an open position by a spring 148 or other biasing member and pivoting about pivot pins 150. A housing 152 receives the tangs 146, the spring 148 and the pins 150, as well as the fuel cell adapter 122. The tangs 146 are each configured for grasping the fuel cell adapter 122 at the gripping area 142 for holding the adapter, and the fuel cell 10 in position in the fuel cell chamber 89 in the tool 86. The tension of the spring 148 is such that the tangs 146 are easily separated by the insertion force of the fuel cell 10 into the fuel cell cavity 152. Also, the tangs 146 are positioned so that when they engage the gripping area, the injector cartridge inlet end 118 is in close operational proximity to the outlet 28 of the main valve stem 26.

To release the clamped adapter 122, a release button 154 is configured for moving transversely relative to the fuel cell 10, and includes a depending tab 156 to which enters a corresponding slot in the housing enclosure 110 and engages and separates the tangs 146, allowing withdrawal of the adapter and the fuel cell. A return spring 158 biases the release button 154 and the tab 156 out of engagement with the tangs 146. Also, it is preferred that the release button 154 be accessible externally of the tool housing 84, however, other locations are contemplated. A release pin or latch 160 is transversely engageable on the housing enclosure 110 near the injector cartridge 108, and is optionally provided for allowing disassembly of the housing enclosure and the withdrawal of the injector cartridge, such as for cleaning or replacement.

Upon completion of the fastener driving cycle, the user lifts the tool 86 from the workpiece, which causes the workpiece contact element 94 to depend relative to the tool 86, thus releasing the actuator arm 98, and releasing pressure on the main valve stem 26. The biasing element 36 causes the main valve stem 26 to move to the closed position (FIG. 1), in which a new dose of fuel enters the fuel metering chamber 38 from the container 22.

While particular embodiments of the present fuel metering valve and associated combustion tool have been shown and described, it will be appreciated by those skilled in the art that changes and modifications may be made thereto without departing from the invention in its broader aspects and as set forth in the following claims.

The invention claimed is:

1. A fuel cell for use with a combustion tool, comprising:
a housing defining an open end enclosed by a closure;
a main valve stem having an outlet, disposed in operational relationship to said open end and reciprocable relative to said housing at least between a closed position wherein said stem is relatively extended, an open position wherein said stem is relatively retracted and a container filling position wherein said stem is retracted further than in said open position to allow filling of a container within said housing through said outlet, said valve including a fuel metering chamber disposed in close proximity to said closure and configured so that when said stem is in said open position, only a measured amount of fuel is dispensed through said outlet, said fuel metering chamber being defined in part by a main seal forming a wall of said chamber and a body having a valve stem seal, wherein said stem has an exterior including a first diameter section defining a non-sealing relationship with said valve stem seal in said closed position, a second diameter section being enlarged with respect to said first diameter and defining a sealing relationship with said valve stem seal in said open position, and a third diameter section being reduced with respect to said first diameter and defining a clearance with said valve stem seal in said container filling position;

wherein said housing includes a separate fuel container, wherein the flow of fluid out the outlet of the fuel cell is solely from said separate fuel container.

2. The fuel cell of claim 1 wherein said main valve stem second diameter is a generally radially enlarged portion, and said valve stem seal is a lip seal constructed and arranged to engage said enlarged portion in said open position, but defining a fuel passage therebetween in said closed and said container filling positions.

3. The fuel cell of claim 1 wherein a second end of a main valve body enclosing said fuel metering chamber is provided with a plurality of slots configured for facilitating, in said container filling position, fluid communication between a region adjacent said main valve stem into an interior of said fuel cell.

4. A fuel cell for use with a combustion tool, comprising:
a housing defining an open end enclosed by a closure;
a main valve stem having an outlet, disposed in operational relationship to said open end and reciprocating relative to said housing at least between a closed position wherein said stem is relatively extended, and an open position wherein said stem is relatively retracted;
a fuel metering valve located within said housing, associated with said main valve stem, including a fuel metering chamber configured so that when said stem is in said open position, only a measured amount of fuel is dispensed through said outlet, said fuel metering chamber includes a body defined by two components, one of which having a seal for engaging said main valve stem, said stem having a radially variable exterior contour periodically sealingly engaging said seal such that in said closed position a non-sealing relationship is defined between said stem and said seal, and in said open position a sealing relationship is defined between said stem and said seal;
said housing includes a separate fuel container, and said fuel metering valve includes a valve body that has a second end opposite said fuel metering chamber and located within said container, wherein the flow of fluid out the outlet of the fuel cell is solely from said separate fuel container; and
a biasing element for urging said stem to said closed position, said biasing element located between said fuel metering chamber and said second end of said valve body.

5. The fuel cell of claim 4 wherein said main valve stem has a radially enlarged portion, and said fuel metering chamber seal is a lip seal constructed and arranged to engage said enlarged portion in said open position, but defining a fuel passage therebetween in said closed position.

6. The fuel cell of claim 4 further including a clamp ring for sandwiching a portion of said container between said valve body and said clamp ring.

7. The fuel cell of claim 4 wherein said fuel metering valve includes a main seal, and said main valve stem includes a radial projection for engaging said main seal.

8. The fuel cell of claim 7 wherein said radial projection is urged against said main seal.

9. The fuel cell of claim 4 wherein said fuel metering chamber surrounds said main valve stem and includes a first end engaging a main seal and a second end sealingly engaging an enlarged diameter portion of said main valve stem in said open position, and defining a fuel permeable separation from a main diameter of said main valve stem in said closed position.

10. The fuel cell of claim 9 wherein said component of said fuel metering chamber having said seal is provided in the form of a radially inwardly projecting lip seal configured for wipingly engaging said reciprocating valve stem.

11. The fuel cell of claim 4 wherein said main valve stem and said fuel metering chamber are configured for movement of said main valve stem to a container filling position whereby said stem is retracted further than in said open position, and a fluid passageway is defined from said outlet to a container located within said housing.

12. The fuel cell of claim 11 wherein a second end of a main valve body enclosing said fuel metering chamber is provided with at least one slot configured for facilitating, in said container filling position, fluid communication between a region adjacent said main valve stem into an interior of said fuel cell.

13. The fuel cell of claim 11 wherein the said main valve stem changes position relative to said fuel metering chamber in said open, closed and container filling positions.

14. The fuel cell of claim 13 wherein said main valve stem has a radially enlarged portion, and said fuel metering chamber is provided with a lip seal constructed and arranged to engage said enlarged portion in said open position, but defining a fuel passage therebetween in said closed and said container filling positions.

15. The fuel cell of claim 4 wherein the measured amount generally corresponds to the volume of said metering chamber.

16. A combined fuel cell and combustion tool, comprising:
a combustion tool configured for receiving a fuel cell including a workpiece contact element associated with a linkage having an arm configured for triggering the dispensing of a fuel upon movement of said workpiece contact element;
a fuel cell housing defining an open end enclosed by a closure;
a main valve stem having an outlet, disposed in operational relationship to said open end and reciprocable relative to said housing at least between a closed position wherein said stem is relatively extended, and an open position wherein said stem is relatively retracted;
a fuel metering valve located within said fuel cell housing, associated with said main valve stem, including a valve body and a fuel metering chamber and configured so that when said stem is in said open position, only a measured amount of fuel is dispensed through said outlet; and
a biasing element for urging said stem to said closed position, said biasing element located between said fuel metering chamber and said second end of said valve body;

said main valve stem has a diameter extending substantially lengthwise on said stem and a radially enlarged portion extending radially beyond said diameter, and said fuel metering chamber is provided with a lip seal, such that in said closed position a non-sealing relationship is provided defining a fuel passage between said stem and said seal, and in said open position a sealing relationship is defined between said radially enlarged portion and said seal;

said housing encloses a separate flexible fuel container, wherein the flow of fluid out the outlet of the fuel cell is solely from said separate fuel container.

17. The combination of claim 16 wherein said fuel metering valve valve body has a second end opposite said fuel metering chamber located within said container.

18. The fuel cell of claim 16 further including a clamp ring for sandwiching a portion of said container between said valve body and said clamp ring.

19. The fuel cell of claim 16 wherein said arm pivots about a pivot point during movement of said workpiece contact element.

* * * * *